United States Patent [19]

Ogiwara et al.

[11] Patent Number: 4,919,001
[45] Date of Patent: Apr. 24, 1990

[54] COARSE/FINE ADJUSTMENT COAXIAL HANDLE FOR FEEDING MICROSCOPE STAGE

[75] Inventors: Takashi Ogiwara; Kesao Isono, both of Ina; Masahide Katagiri, Hachiouji, all of Japan

[73] Assignee: Olympus Optical Co., Ltd., Tokyo, Japan

[21] Appl. No.: 254,923

[22] Filed: Oct. 7, 1988

[30] Foreign Application Priority Data

Oct. 9, 1987 [JP] Japan .................. 62-255614
Oct. 9, 1987 [JP] Japan .................. 62-255615

[51] Int. Cl.$^5$ .............. G02B 21/26; F16H 37/06; G05G 11/00
[52] U.S. Cl. .................. 74/10.52; 74/10.54; 74/89.15; 74/479; 475/323; 350/530
[58] Field of Search .......... 74/89.15, 10.52, 10.54, 74/424.8 R, 479, 626, 781 R, 789; 350/530

[56] References Cited

U.S. PATENT DOCUMENTS

| | | | |
|---|---|---|---|
| 3,019,705 | 2/1962 | Wilkinson | 74/10.52 X |
| 3,355,955 | 12/1967 | Aller | 74/10.52 |
| 3,683,704 | 8/1972 | Kuroha | 74/10.52 |
| 4,173,902 | 11/1979 | Shio | 74/10.54 X |

Primary Examiner—Allan D. Herrmann
Attorney, Agent, or Firm—Cushman, Darby & Cushman

[57] ABSTRACT

The coarse/fine adjustment coaxial handle for feeding microscope stage comprises a feed screw shaft, a tubular member rotatably fitted over the feed screw shaft and equipped with a disc plate fixed thereto, a fine adjustment handle rotatably fitted over the tubular member and surrounding the disc plate, a reduction gear mechanism interposed between the feed screw shaft and the fine adjustment knob, a first frictional resistance imparting mechanism for imparting frictional resistance to the tubular member, second frictional resistance imparting mechanism for imparting frictional resistance to the disc plate, and a coarse adjustment handle pivoted to an eccentric position on another disc plate connected to the disc plate. The coarse/fine adjustment coaxial handle permits very fine stage feeding without fail and coarse adjustment smoothly with simple operations.

4 Claims, 2 Drawing Sheets

COARSE/FINE ADJUSTMENT COAXIAL HANDLE FOR FEEDING MICROSCOPE STAGE

BACKGROUND OF THE INVENTION (a) Field of the invention

The present invention relates to a microscope, and more specifically a coarse/fine adjustment coaxial handle for feeding a microscope stage.

(b) Description of the prior art

Most of the conventional stage feeding mechanisms for microscopes have only the fine adjustment handle, and a few have both the fine adjustment handle and the coarse adjustment handle. The stage feeding mechanisms having both the handles are so designed as to perform switching between the coarse adjustment and fine adjustment by switching a half nut between fixed condition and non-fixed condition, thereby posing a problem that the tedious procedures are required. Further, the coarse/fine adjustment coaxial handle for driving the microscope tube is equipped with a small-diameter fine adjustment handle located within the coarse adjustment handle and feeds the stage for a relatively long distance at a predetermined rotational angle, thereby incapable of feeding stage for a very short distance. Furthermore, since the coarse adjustment usually causes stage feeding for rather a long distance, it is necessary to re-grip the coarse adjustment handle repeatedly, thereby posing a problem that the onerous and time-consuming operations are required. Moreover, certain stage feeding mechanisms equipped with both the coarse adjustment handle and the fine adjustment handle are of the type wherein the feed screw shaft is rotated integrally with the gear supporting member, i.e., in the directly coupled condition without functioning the reduction gear mechanism when the coarse adjustment handle is turned, and the feed screw mechanism is rotated while functioning the reduction gear mechanism with the gear supporting membe fixed, i.e., in the speed reduction condition. In case of the stage feeding mechanism of this type, however, the coarse adjustment is impossible when the gear supporting member is fixed completely and, in addition, torque cannot be released during the fine adjustment when the rotation of the feed screw shaft is stopped by an external force (when the stage is stopped by a stopper), thereby imposing overload on the engaged portions, etc. of the gears. In order to avoid this overload, it was conventionally practised to impart frictional resistance to the gear supporting member by using an elastic pressing member so that the gear supporting member is moved integrally with the reduction gear (not rotated) during the coarse adjustment against said frictional resistance, whereas the reduction gear is rotated with the gear supporting member fixed by said frictional resistance during the fine adjustment, and when the rotation of the feed screw shaft is stopped by the external force, the gear supporting member is rotated against said frictional resistance during both the coarse and fine adjustments, whereas the opposite handles, i.e., the fine adjustment handle and the coarse adjustment handle are idled by way of the reduction gear. In this case, however, there has been posed a problem that coarse adjustment cannot be performed easily due to too large torque to be required when the frictional resistance is too high though fine adjustment is performed securely when the frictional resistance is adequate.

SUMMARY OF THE INVENTION

A primary object of the present invention is to provide a coarse/fine adjustment coaxial handle for feeding microscope stage capable of performing very fine feeding without fail and coarse adjustment smoothly with simple operations.

The coarse/fine adjustment coaxial handle for feeding microscope stage according to the present invention comprises a feed screw shaft pivoted on a base block and screwed in a stage supporting member, a tubular member rotatably fitted over the feed screw shaft and equipped with a disc plate fixed to one end thereof, a fine adjustment handle rotatably fitted in the tubular member and having an outer circumferential wall surrounding said disc plate, a reduction gear mechanism having an intermediate gear pivoted to the disc plate and interposed between the fine adjustment handle and the feed screw shaft, a first frictional resistance imparting mechanism for imparting frictional resistance to the tubular member with an elastic member interposed between the other end of the tubular member and the base block, and a coarse adjustment handle surrounded by the outer circumferential wall of the fine adjustment handle and pivoted at an eccentric position on another disc plate fixed to the disc plate. Accordingly, the coarse/fine adjustment coaxial handle for feeding microscope stage according to the present invention enables operation for the coarse or fine adjustment simply by re-gripping the handle without switching operation, permits enlarging diameter of the fine adjustment handle and allows to continuously manipulate the coarse adjustment handle without re-gripping.

In a preferable formation of the present invention, the coarse/fine adjustment coaxial handle further comprises second frictional resistance imparting mechanism for imparting frictional resistance to the disc plate with elastic pressing member interposed between the disc plate and the inside surface of the circumferential wall of the fine adjustment handle. In this formation, the frictional resistance required for fixing the disc plate used as the gear supporting member and the tubular member during the fine adjustment is obtained from the two frictional resistance imparting mechanisms, whereby the frictional resistance shared by the first frictional resistance imparting mechanism is smaller than that in the conventional stage feeding mechanisms.

This and other objects as well as the features and advantages of the present invention will become apparent from the following detailed description of the preferred embodiment when taken in conjunction with the accompanying drawings.

DESCRIPTION OF THE PREFERRED EMBODIMENT

Now, the present invention will be detailedly described with reference to the accompanying drawings illustrating an embodiment thereof.

Figure 1:
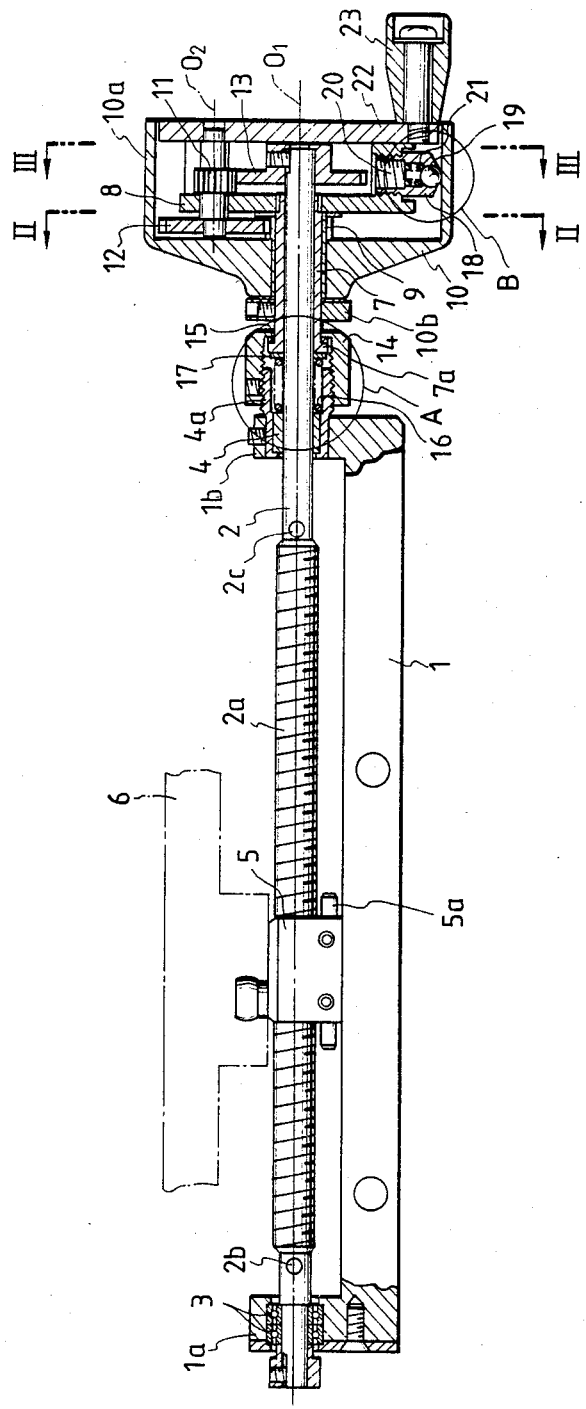
FIG. 1 is a sectional view illustrating an embodiment of the coarse/fine adjustment coaxial handle for feeding microscope stage according to the present invention.
Figure 2:
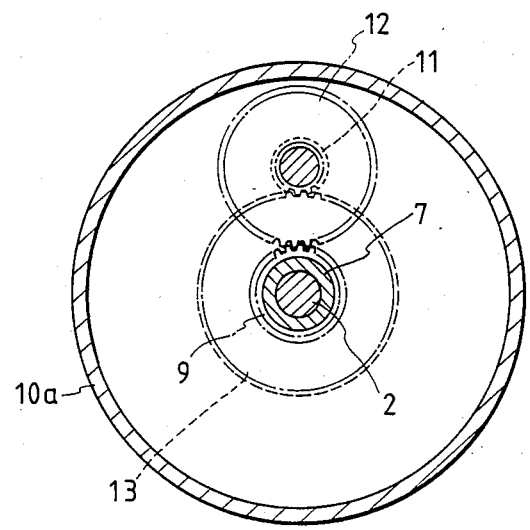
FIG. 2 is a sectional view taken along the II—II line in FIG. 1.
Figure 3:
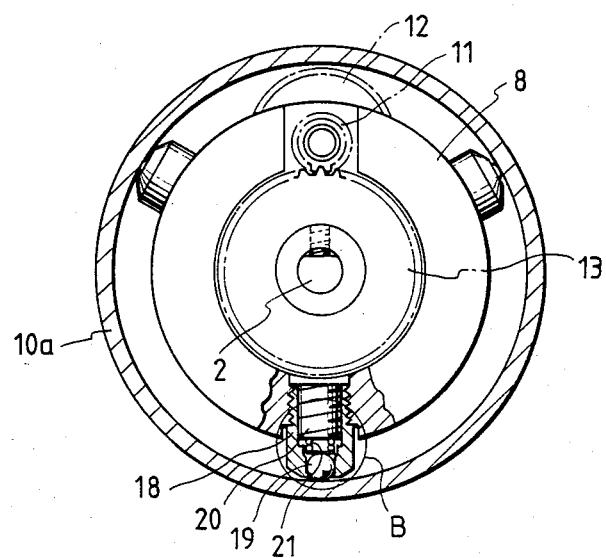
FIG. 3 is a sectional view taken along the III—III line in FIG. 1.

In FIG. 1 through FIG. 3, the reference numeral 1 represents a base block fixed to a microscope body, the reference numeral 2 designates a feed screw shaft which is rotatably supported by bearings 3 and a bush 4 between the side walls 1a and 1b of the base block 1, and has a multiple number of threads 2a, and the reference numeral 5 denotes a stage supporting member which is slidably arranged on the base block 1, screwed over the feed screw shaft 2 and so designed as to mount a stage 6 on the top end thereof, the stage supporting member 5 being fed in the horizontal direction in FIG. 1 by turning the feed screw shaft 2. The reference numerals 2b and 2c represent pins running through and fixed in the vicinity of the right and left ends of the feed screw shaft 2, and the reference numeral 5a designates a pin running through and fixed to the stage supporting member 5, the pin 5a functioning to prevent the stage supporting member 5 from being further fed by engagement with the pin 2b and pin 2c respectively when the stage supporting member 5 is displaced near the right or left end of the feed screw shaft 2. The reference numeral 7 represents a tubular member which is rotatably fitted over the right side protruding end of the feed screw shaft 2, has a flange 7a formed at the left end thereof and is equipped with a disc plate 8 fixedly attached to the right end thereof, the reference numeral 9 designates a tubular gear which is rotatably fitted over the tubular member 7 and has a tooth formed only at the right end thereof, the reference numeral 10 denotes a fine adjustment knob which is fixed to the tubular gear 9 for rotation therewith and has an circumferential wall 10a surrounding the disc plate 8, and the reference numeral 10a represents a ring fitted over the tubular member 7 and fixed for preventing leftward displacement of the tubular gear 9 and the fine adjustment knob 10. In addition, rightward displacement of the tubular gear 9 is prevented by the disc plate 8. The reference numeral 11 represents a gear pivoted to the disc plate 8, the reference numeral 12 designates a gear which is fixedly attached to the left end of the gear 11 and engaged with the tubular gear 9, and the reference numeral 13 denotes a gear which is fixedly attached to the right protruding tip of the feed screw shaft 2 and engaged with the gear 11. A geared reduction mechanism is composed by selecting relations of $Z_1 < Z_2$ and $Z_3 < Z_4$ for the numbers of teeth $Z_1$, $Z_2$, $Z_3$ and $Z_4$ of the gears 9, 12, 11 and 13 respectively. The reference numeral 14 represents a holder which has a right side inner edge rotatably fitted over the tubular member 7, is engaged with the flange 7a of the tubular member 7 from the right side with a washer 15 interposed and axially movably screwed in the thread 4a of the bush 4 and can be fixed by the thread 4a, and the reference numeral 16 denotes a spring which is arranged with a resin washer interposed between the flange 7a of the tubular member 7 and inside end surface of the bush 4 in the holder 14. The first frictional resistance imparting mechanism A for imparting frictional resistance to the tubular member 7 is composed by pressing the flange 7a to the right side inside edge of the holder 14 by way of the resin washer 15 with the members mentioned above and the frictional resistance is adjustable by moving the holder 14. The reference numeral 18 represents a plunger screwed to the circumference of the disc plate 8 so as to be movable in the radial direction of the disc plate 8, the reference numeral 19 designates a ball held in the tip of the plunger 18 so as to be movable in the radial direction of the disc plate 8, the reference numeral 20 denotes a screw which is screwed to the rear end of the plunger 18 so as to be movable in the radial direction of the disc plate 8, and the reference numeral 21 represents a spring interposed between the screw 20 and the ball 19. The second frictional resistance imparting mechanism B for imparting frictional resistance to the disc plate 8 and the tubular member 7 is composed by pressing the ball 19 to the inside surface of the circumference of the fine adjustment knob 10 with the members mentioned above and the frictional resistance is adjustable by moving the screw 20. In addition, this embodiment comprises three sets of the second frictional resistance imparting mechanism arranged at equal angle intervals along the circumference of the disc plate 8 for preventing the frictional resistance from being varied due to eccentricity between the disc plate 8 and other circumferential wall 10a of the fine adjustment knob 10. Needless to say, it is possible to use two sets of the second frictional resistance imparting mechanism so long as centering accuracy is sufficiently high or in any optional numbers of the second frictional resistance imparting mechanism in practice.

Now, let us assume that the torque required for turning the feed screw shaft 2 (the torque required for driving the stage 6) is represented by $T_1$, the torque required for rotating the tubular member 7 against the frictional resistance imparted to the tubular member 7 by the first frictional resistance imparting mechanism A is designated by $T_2$ and the torque required for rotating the disc plate 8 and the tubular member 7 against the frictional resistance imparted to the disc plate 8 and the disc plate 8 and the tubular member 7 by the second frictional resistance imparting mechanisms B as a whole is denoted by $T_3$. Then, the requirements for performing the fine adjustment securely are as follows:

$$T_1 < T_2 + T_3 \tag{1}$$

$$T_2 > T_3 \tag{2}$$

The reference numeral 22 represents another disc plate which is located in the outer circumferential wall 10a of the fine adjustment knob 10 and fixed to the disc plate 8 by means such as a screw, and the reference numeral 23 designates a coarse adjustment handle pivoted to an eccentrical position on the disc plate 22.

Now, description will be made on the operations of the embodiment of the present invention. For the coarse adjustment, the disc plates 22 and 8 are turned first around the center axis $O_1$ of the feed screw shaft 2 by manipulating the coarse adjustment handle 23. Though the torque applied at this time is transmitted through the gears 11 and 13 to the feed screw shaft 2, the gear 11 does not turn around the center axis $O_2$ thereof but rotates around the center axis $O_1$ while being engaged with the gear 13 at the same position, i.e., together with the gear 13, thereby turning the feed screw shaft 2. Accordingly, the coarse adjustment is performed since number of rotations ($R_1$) of the feed screw shaft 2 is equal to the number of rotations ($R_1$) of the disc plate 22. At this time, the gear 12 is engaged with the gear 9 and turned at the same angle of rotation as the disc plate 8, i.e., together with the disc plate 8.

At this stage, the tubular member 7 is also turned due to the rotation of the disc plate 8. However, since the torque required for rotating the tubular member 7 against the frictional resistance imparted by the first frictional resistance imparting mechanism A is $T_2$, the torque $T_a$ required for the coarse adjustment is smaller than $T_1+T_2$. However, the required torque $T_a$ is reduced since value of $T_2$ can be set smaller than that in the conventional example wherein $T_1$ is smaller than $T_2$ as is clear from the above-mentioned requirement (1).

When the disc plates 22 and 8 are turned by further manipulating the coarse adjustment handle 23 after the stage 6 stops during the coarse adjustment, the gear 11 performs planetary movement around the center axis $O_1$ while rotating around the center axis $O_2$ since the feed screw shaft 2 and the gear 13 are stopped. The torque of the gear 11 is transmitted through the gears 12 and 9 to the fine adjustment knob 10, whereby the fine adjustment knob 10 turns idly to prevent overload from being imposed on the engaged portions, etc. of the gears.

For fine adjustment of themicroscope stage, the fine adjustment knob 10 is gripped and turned around the center axis $O_1$ of the feed screw shaft 2. Since the tubular member 7 and disc plate 8 are prevented from turning by the frictional resistance imparted by the first and second frictional resistance imparting mechanisms A and B, the torque is transmitted to the feed screw shaft 2 without fail by way of the gears 9, 12, 11 and 13, thereby turning the feed screw shaft 2. When number of rotations of the fine adjustment handle 10 is represented by $R_1$ in addition to the numbers of teeth $Z_1$, $Z_2$, $Z_3$ and $Z_4$ ($Z_1<Z_2$ and $Z_3<Z_4$) of the gears 9, 12, 11 and 13 respectively defined above, number of rotations $R_2$ of the feed screw shaft 2 is expressed as follows:

$$R_2 = Z_1/Z_2 \times Z_3/Z_4 \times R_1$$

Hence, $R_2$ is smaller than $R_1$. The fine adjustment is performed without fail accordingly.

When the fine adjustment knob 10 is turned further after the stage stops during the fine adjustment, the torque transmitted from the gear 9 to the gear 12 is converted into a torque causing rotations of the disc plates 8 and 22 around the center axis $O_1$ (the gear 12 performs planetary movement around the center axis $O_1$ at this time) since the feed screw shaft 2 and the gear 13 are stopped, whereby the disc plates 8 and 22 rotate idly to prevent overload from being imposed on the engaged portions, etc. of the gears.

The operations of the embodiment of the present invention have been described above. As is understood from the foregoing description, the coarse/fine adjustment coaxial handle for feeding microscope stage according to the present invention is capable of performing stage adjustment with simple manipulations since it permits switching between the coarse adjustment and the fine adjustment simply by re-gripping the handle with no switching operation. Further, since the fine adjustment knob 10 is externally located and can have a large diameter, it permits very fine stage feeding. Furthermore, since the coarse adjustment handle 23 can be manipulated continuously without re-gripping, it permits the coarse adjustment speedily.

What is claimed is:

1. A coarse/fine adjustment coaxial handle for feeding microscope stage comprising a feed screw shaft rotatably supported on a base block and screwed in a stage supporting member, a tubular member rotatably fitted over said feed screw shaft and equipped with a first disc plate fixed to the tubular member at one end thereof, a fine adjustment knob rotatably fitted over said tubular member and having an outer circumferential wall surrounding said first disc plate, a reduction gear mechanism including a intermediate gear pivoted on said first disc plate and interposed between said fine adjustment knob and said feed screw shaft, a first frictional resistance to said tubular member with an elastic pressing member interposed between the other end of said tubular member and said base block, a second disc plate rotatably fitted within said fine adjustment knob and connected to said first disc plate, and a coarse adjustment handle pivoted to an eccentric position on said second disc plate.

2. A coarse/fine adjustment coaxial handle for feeding microscope stage according to claim 1 wherein said fine adjustment knob is formed as a thick disc-like member and said coarse adjustment knob is formed as a pin-like member protruding in the direction of the center axis of said fine adjustment handle.

3. A coarse/fine adjustment coaxial handle for feeding microscope stage according to claim 1 further comprising at least one second frictional resistance imparting mechanism for imparting frictional resistance to said first disc plate with elastic pressing member interposed between said first disc plate and the inside surface of the circumferential wall of said fine adjustment knob.

4. A coarse/fine adjustment coaxial handle for feeding microscope stage according to claim 3 so adapted as to satisfy the following conditions:

$$T_1 < T_2 + T_3$$

$$T_2 > T_3$$

wherein the reference symbol $T_1$ represents the torque required to turn said feed screw shaft, the reference symbol $T_2$ designates the torque required to turn said tubular member against the frictional resistance imparted to said tubular member by said first frictional resistance imparting mechanism, and the reference symbol $T_3$ denotes the torque required to turn said first disc plate and tubular member against the frictional resistance imparted to said first disc plate and tubular member by said second frictional resistance imparting mechanism.

* * * * *